United States Patent
Echizen et al.

(10) Patent No.: US 6,865,677 B1
(45) Date of Patent: Mar. 8, 2005

(54) CONTENTS RENDERING CONTROL METHOD, CONTENTS REPRODUCING EQUIPMENT, AND CONTENTS DISTRIBUTION EQUIPMENT

(75) Inventors: Isao Echizen, Yokohama (JP); Hiroshi Yoshiura, Tokyo (JP); Ryoichi Sasaki, Fujisawa (JP); Shinichiro Harano, Yokohama (JP); Shinobu Eikawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 543 days.

(21) Appl. No.: 09/659,551

(22) Filed: Sep. 11, 2000

(30) Foreign Application Priority Data

Jul. 6, 2000 (JP) .................................... 2000-205511

(51) Int. Cl.⁷ .............................................. G06F 12/14
(52) U.S. Cl. .................... 713/176; 705/57; 380/201; 380/54
(58) Field of Search ................................ 713/176, 177, 713/175, 200–202; 705/51, 52, 57, 58, 64; 380/201, 202, 54

(56) References Cited

U.S. PATENT DOCUMENTS

| | | | |
|---|---|---|---|
| 5,761,301 A | * 6/1998 | Oshima et al. | 380/4 |
| 6,233,684 B1 | * 5/2001 | Stefik et al. | 713/176 |
| 6,266,419 B1 | * 7/2001 | Lacy et al. | 380/269 |
| 6,320,829 B1 | * 11/2001 | Matsumoto et al. | 369/47.12 |
| 6,490,683 B1 | * 12/2002 | Yamada et al. | 713/176 |
| 2002/0073037 A1 | * 6/2002 | Katoh | 705/57 |

FOREIGN PATENT DOCUMENTS

JP 02000156781 A * 6/2000

\* cited by examiner

*Primary Examiner*—Pierre Elisca
(74) *Attorney, Agent, or Firm*—McDermott Will & Emery LLP

(57) ABSTRACT

To enable the control of rendering contents in part by using digital watermark technique:
a contents serving center for embedding watermark in contents 4 embeds control information as digital watermarks within at least one of a plurality of blocks constituting electronic data by which contents are represented, thereby specifying the application of filtering to a part of the contents corresponding to the block; a contents distribution center 1 distributes the watermark-including contents to a receiving terminal 2 where checks the blocks of the received data to detect whether the control information as digital watermarks is embedded therein and applies the filtering to the block for which the embedded control information embedded has been detected in advance of reproducing the contents.

23 Claims, 12 Drawing Sheets

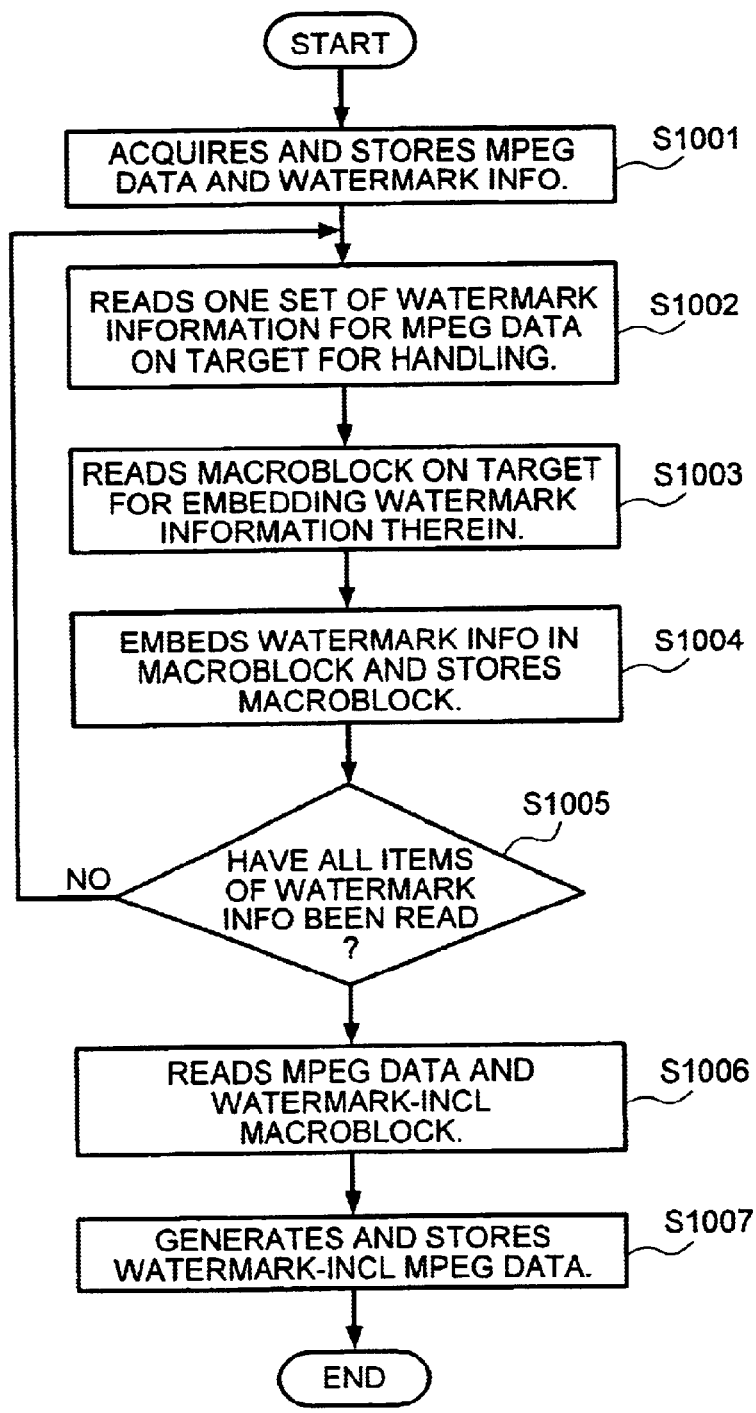

FIG.4

WATERMARK INFORMATION STORE 422

| Contents No. | Macro block No. | Control info | Level info |
|---|---|---|---|
| No. ***** | No. ****** | Smoothing | User level: Underage |
| | No. ****** | Smoothing | User level: Underage |
| | No. ****** | Smoothing | Region level: country A |
| | | Mosaic | Region level: country B |
| | | Solid black | Region level: country C |
| | No. ****** | Smoothing | Distributor level: Public |
| | No. ****** | Smoothing | Distributor level: Public |
| No. **** | No. *** | Mosaic | User level: Student |
| | No. *** | Mosaic | User level: Student |
| | No. *** | Mosaic | User level: Student |

Column labels: 4221, 4222, 4223, 4224

FIG.9

LEVEL INFORMATION RETAINING SECTION 24

| | | |
|---|---|---|
| 2411 | Contents user ID | ******** |
| 2412 | Age of user | Underage |
| 2413 | Social position of user | Student |
| 2414 | Region on target of marketing | Japan |
| 2415 | Contents distributor ID | ***** |

CONTENTS RENDERING CONTROL METHOD, CONTENTS REPRODUCING EQUIPMENT, AND CONTENTS DISTRIBUTION EQUIPMENT

This application claims priority from Japanese Patent Application Reference No. 2000-205511, filed Jul. 6, 2000, the entire content of which is incorporated here by reference for all purpose.

BACKGROUND OF THE INVENTION

The present invention relates to the art of control of rendering contents by using digital watermarks.

Heretofore, electronic data such as video data and audio data by which contents are represented have been distributed to users via communication media such as Internets and digital broadcasting, or a storage medium such as CD-ROM and DVD-ROM. Because, characteristically, electronic data can easily be duplicated, there is a possibility of illegal distribution of data by a third party or making data available by dishonest means. To make the contents open to only people who have valid authority, reproduction control and copy control by using a digital watermark technique have been proposed heretofore.

Recent internationalized markets lead to that same contents can be distributed in various regions in the world. Some representation included in contents may be accepted in a region, whereas it may be inappropriate for society in another region, due to the difference of cultures and habits. Even for local distribution in a region, it is possible that a part of contents should be concealed, which depends on the age, social position, occupation, and some other attribute of the user of the contents.

In this way, the widespread distribution of same contents makes it necessary that contents be tailored for local cultures and customs in different regions where they are distributed and that contents be prepared, part of which may or may not be concealed, depending on the age, social position, and some other attribute of the user.

SUMMARY OF THE INVENTION

The present invention provides arts of control of rendering contents in part by using the digital watermark technique. Application of the invention makes it possible to distribute contents to regions of local diversification and supply contents in a form suitable for the user attribute, such as age, social position, etc. among various users.

According to the invention, control information to specify that predetermined image processing for rendering control (hereinafter, referred to as filtering) is applied to predetermined parts of contents are embedded in advance as digital watermarks in the electronic data by which contents are represented.

More specifically, in a first aspect of the invention, the electronic data by which contents are represented is prepared beforehand by embedding control information as digital watermarks within at least one of a plurality of blocks into which the electronic data is disassembled, wherein the control information specifies the application of predetermined filtering to a part of the contents corresponding to the block in which watermark has been embedded or a plurality of blocks including that block.

The equipment to reproduce or distribute the above contents, in advance of reproducing the contents from the electronic data of the contents or distributing the electronic data, checks each of the above plurality of blocks to detect whether control information is embedded therein as digital watermark information, detects control information, if detected, out of there, and applies predetermined filtering to the block from which control information has been detected or a plurality of blocks including that block.

In a second aspect of the invention, the electronic data by which contents are represented is prepared by embedding control information as digital watermarks within at least one predetermined portion thereof wherein the control information specifies the application of predetermined filtering to any pre-defined portions thereof.

The equipment to reproduce or distribute the above contents, in advance of reproducing the contents from the electronic data of the contents or distributing the electronic data, detects the control information embedded as digital watermark information from the above predetermined portion of the electronic data and applies predetermined filtering to the portions of the electronic data as specified by the control information.

The above predetermined filtering includes; for example, rendering control to conceal, smoothing or mosaic blocks or portions on target. If electronic data by which the contents are represented is video data or image data, the rendering control includes mosaic patching, smoothing, and solid coloring to a given color. If the electronic data is audio data, the rendering control includes muting and translating into a given tone.

In the first aspect of the invention, each of the plurality of blocks constituting the electronic data by which contents are represented is checked as to whether control information has been embedded therein as digital watermarks, and control information, if detected, is detected out of there. Thereby, determination is made as to whether filtering is applied to the checked block or a plurality of blocks including that block. In the second aspect of the invention, control information is detected from a predetermined portion of the electronic data by which contents are represented and what portions of the electronic data to which filtering is applied are determined as specified by the control information. Thus, filtering on the contents in part can be executed.

The invention is favorable in that level information can be specified to determine whether predetermined filtering specified by the control information is to be applied, included in the control information embedded in the contents.

Consequently, the equipment to reproduce or distribute the above contents can determine whether predetermined filtering specified by the control information is to be applied, based on the level information included in the control information detected from the contents.

As the level information, for example, used is the information about the level of the contents user including age, social position, and region where the user resides. Determination can be made as to whether predetermined filtering specified by the control information is to be applied by comparing the level of the contents user specified by the level information included in the control information detected from the contents and the level of the contents user specified by the information that the contents user has registered thereon. Thus, determination can be made as to whether filtering is applied to the contents in part, depending on the user attribute information such as, age, social position, and occupation of the contents user and other information such as region where the contents user resides.

As the level information, for example, used is the information about the level of the contents distributor: e.g., private, public, or region. Determination can be made as to whether predetermined filtering specified by the control information is to be applied by comparing the level of the contents distributor specified by the level information included in the control information detected from the contents and the level of the contents distributor that is distributing the contents in question. Thus, determination can be made as to whether filtering is applied to the contents in part, depending on the category of the contents distributor: private, public, or region.

Alternatively, if the use of region information as the level information is assumed, determination as to whether predetermined filtering specified by the control information is to be applied by comparing the region specified by the level information included in the control information detected from the contents and the region where the contents user resides. Thus, determination can be made as to whether filtering is applied to the contents in part, depending on the region where the contents user resides.

Furthermore, embedding such control information as digital watermarks in contents makes it more difficult to imitate the contents or modify them by dishonest means. A noticeable feature of the invention is that contents' portions to which filtering is applied and what kind of filtering is applied can be controlled in detail.

These and other benefits are described throughout the present specification. A further understanding of the nature and advantages of the invention may be realized by reference to the remaining portions of the specification the attached drawings.

BRIEF DESCRIPTION OF THE DRAWINGS

FIG. 3 is a flowchart illustrating the procedure of processing to be carried out in the contents serving center for embedding watermark in contents 4 shown in FIG. 2;

FIG. 4 shows an example of control information and level information that are stored into a watermark information store 422 shown in FIG. 2;

FIG. 9 shows an example of level information retained in a level information retaining section 24 shown in FIG. 7;

DETAILED DESCRIPTION OF THE PREFERRED EMBODIMENTS

A preferred Embodiment 1 of the present invention will be explained below.

When embodying the present invention in Embodiment 1, the inventor assumed a case where contents are distributed from a contents distribution center 1 to a receiving terminal 2 by using digital broadcasting and filtering to the contents is executed at the receiving terminal 2. Using this case as an example, Embodiment 1 is discussed.

Figure 1:
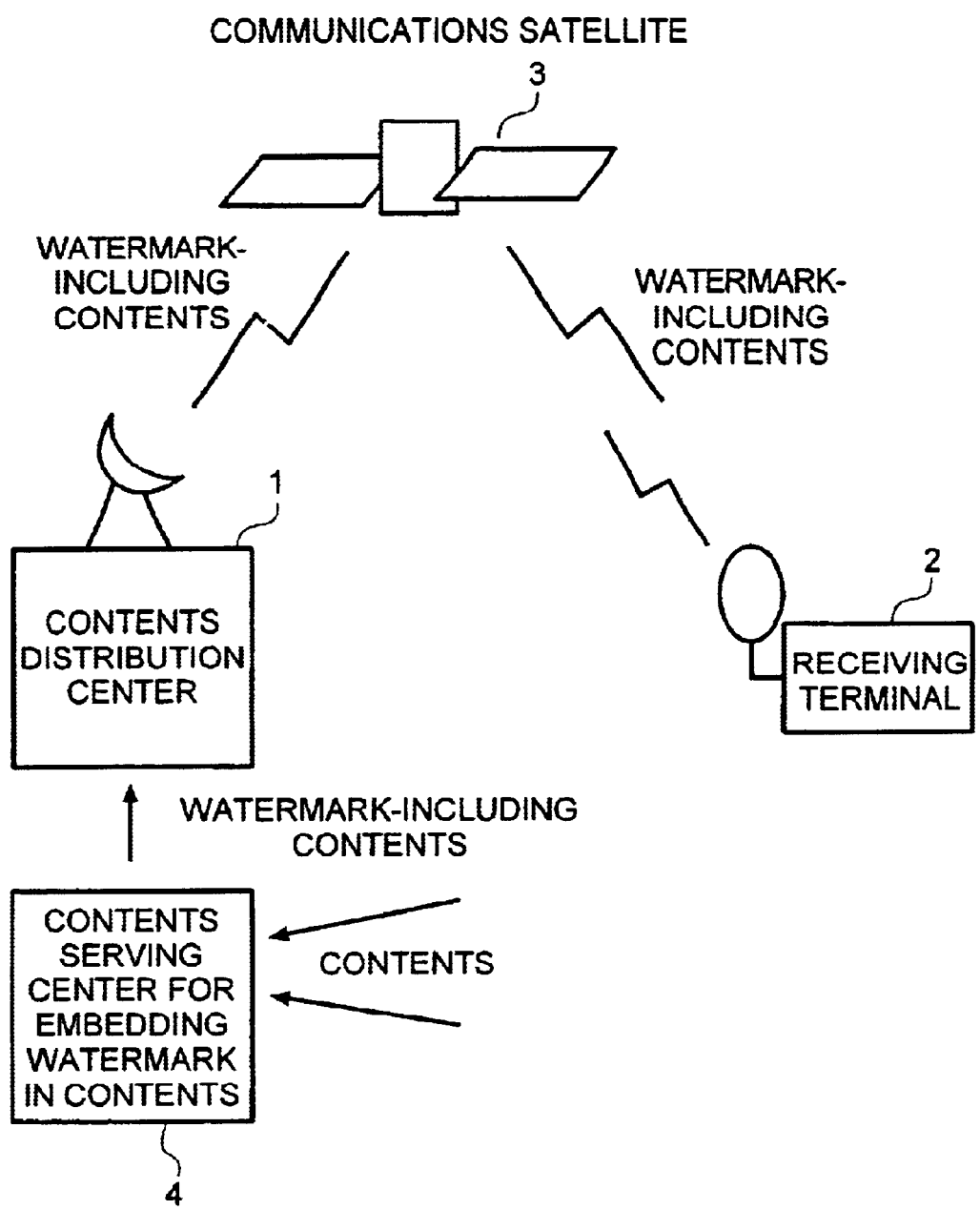
FIG. 1 is a schematic diagram of a contents distribution system to which a preferred Embodiment 1 of the present invention is applied.

As shown in FIG. 1, this contents distribution system has the contents distribution center 1, the receiving terminal 2, and a contents serving center for embedding watermark in contents 4. Although FIG. 1 depicts the single components of the contents distribution center 1, the receiving terminal 2, and the contents serving center for embedding watermark in contents 4, a plurality of the components may be used, of course.

The contents serving center for embedding watermark in contents 4 embeds certain information in contents created by a contents maker or the like by using the digital watermark technique. The information includes control information for applying partial filtering to the contents and level information specifying the conditions for applying the filtering. Then, the contents serving center for embedding watermark in contents 4 supplies watermark-including contents to the contents distribution center 1.

The contents serving center for embedding watermark in contents 4 receives electronic data by which contents are represented and instructions that specify what kind of filtering to be applied, parts of the contents to which filtering shall be applied, and conditions for filtering from the contents maker or the like. If, for example, contents are a text of a test intended for the use in an educational institute such as a school or a cramming school, and if the text contains questions and model answers, when the users (audiences) of the contents are students, the contents serving center for embedding watermark in contents 4 receives instructions specifying that filtering such as smoothing is applied to the contents.

The contents serving center for embedding watermark in contents 4 also may reproduce contents from the electronic data received from the contents maker or the like and check them by itself to determine what kind of filtering is to be applied to whatever parts of the contents under whatever conditions. It, for example, a trademark of a particular corporate is included in the contents and the category of the distributor (e.g., a broadcaster) of the contents is a public corporation, the contents serving center for embedding watermark in contents 4 may determine that filtering such as smoothing be applied to the contents' parts where the trademark appears. Alternatively, if the contents includes representation that is regarded as inappropriate for the underage to view and/or listen to it and the age of the user of the contents is underage, the contents serving center for embedding watermark in contents 4 may determine that filtering such as smoothing be applied to the contents' parts where the representation appears. Alternatively, if the contents includes representation that is regarded as inappropriate for a region in view of laws and social accepted ideas in that region and the user of the contents resides in that region, the contents serving center for embedding watermark in contents 4 may determine that filtering such as smoothing be applied to the contents' parts where the representation appears. The operator of the contents serving center for embedding watermark in contents 4 may carry out the above check and determination, according to predetermined standards such as, for example, instructions from a third-party authority.

For the contents received from the contents maker or the like, the contents serving center for embedding watermark in contents 4 thus identifies filtering to be applied, conditions for filtering application, and locations of the electronic data corresponding to the parts of the contents to which filtering must be applied, according to the instructions received from the contents maker or the third-party authority or the determination by the self-check. If, for example, contents are motion pictures, the locations of the electronic data corresponding to the parts of the contents to which filtering must be applied can be identified from such information as the positions of these parts of the contents when being replayed on a screen and replay timing, the size of the frames constituting the motion pictures, the frame period, etc.

The contents serving center for embedding watermark in contents 4 disassembles the electronic data by which the contents are represented into a plurality of blocks and checks each of these blocks to see whether a part of the contents corresponding to the block includes the contents' part identified as described above to which filtering must be applied. If the block includes the contents' part to which filtering must be applied, the contents serving center for embedding watermark in contents 4 embeds control information specifying the filtering to be applied, which has been identified as described above, and level information specifying the conditions for filtering application in that block by using the digital watermark technique. Then, the contents serving center for embedding watermark in contents 4 supplies the electronic data of the contents (watermark-including contents) in which the control information and level information have thus been embedded as watermark information to the contents distribution center 1.

In Embodiment 1, video data by which contents are represented, supplied from a contents maker or the like, is MPEG data generated in compressed code, according to MPEG coding rules, and the above control information and level information are embedded in contents in units of macroblocks.

The MPEG coding standards are disclosed in ISO/IEC 13818-2/3: "Information Technology-Generic Coding of Moving Pictures and Associated Audio," Draft International Standard, March 1994, the entire contents of which are incorporated herein by reference for all purposes.

The contents distribution center 1 distributes the watermark-including contents received from the contents serving center for embedding watermark in contents 4 to the receiving terminal 2 in a digital broadcasting, form by using a communications satellite 3. In Embodiment 1, watermark-including contents are distributed as MPEG bitstream from the contents distribution center 1 to the receiving terminal 2.

The receiving terminal 2 receives the MPEG bitstream distributed from the contents distribution center 1 via the communications satellite 3. Then, the receiving terminal 2 attempts to detect watermark information for each macroblock of the received MPEG bitstream. If the receiving terminal 2 has succeeded in detecting watermark information from a macro block or macroblocks, it judges whether the conditions (conditions of contents user, contents distributor, region, etc.) specified by the level information included in the watermark information are satisfied. The conditions of contents user, region, etc. are stored in advance into the receiving terminal 2. By comparing these conditions and the conditions specified by the level information, the receiving terminal 2 judges whether the conditions specified by the level information are satisfied.

If the conditions specified by the level information included in the watermark information detected from a macroblock or macroblocks, the receiving terminal 2 executes the filtering specified by the control information included in the watermark information to the macroblock. If the conditions are not satisfied, the receiving terminal 2 does not execute the filtering. Then, the receiving terminal 2 decompresses and decodes the MPEG bitstream for which the filtering has been executed if necessary on a per-macroblock basis and outputs the decoded bitstream to a display connected to it.

Consequently, the contents are displayed on the display connected to the receiving terminal 2 with the predetermined parts thereof modified by filtering such as smoothing, depending on the conditions of contents user, contents distributor, region, etc.

The components of the above contents distribution system will be detailed below.

First, the contents serving center for embedding watermark in contents 4 will be explained.

Figure 2:
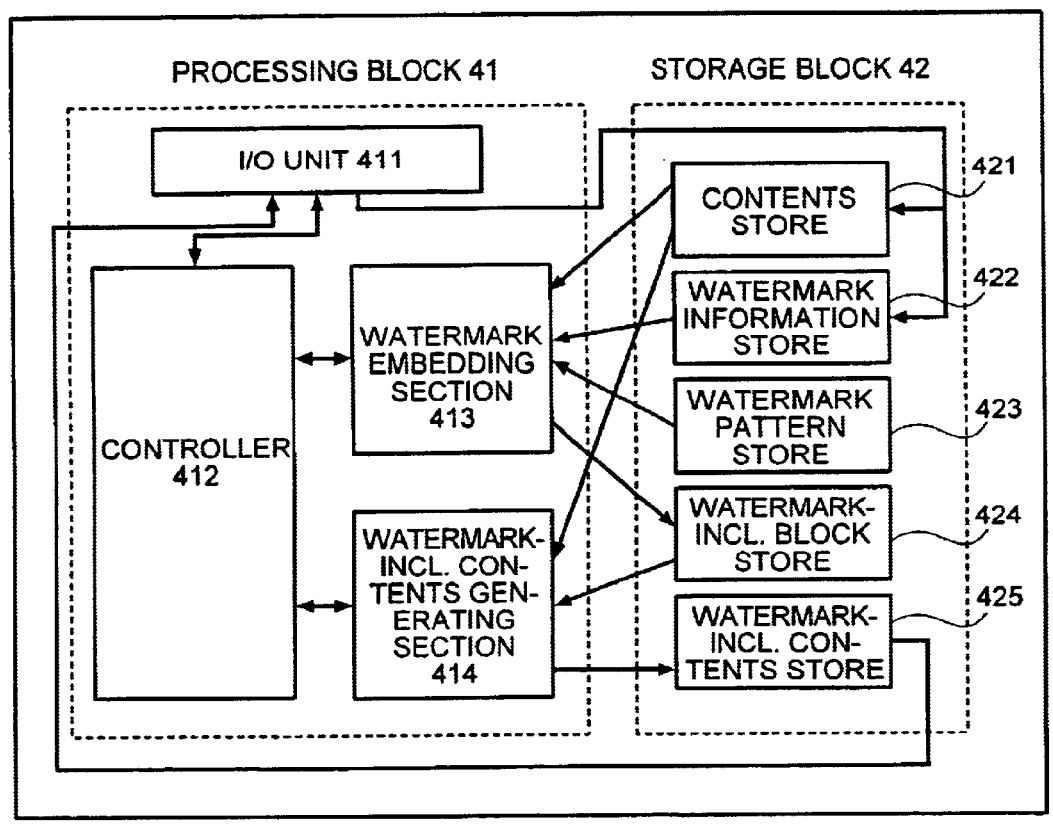
FIG. 2 is a schematic structure diagram of a contents serving center for embedding watermark in contents 4 shown in FIG. 1.

As shown in FIG. 2, the contents serving center for embedding watermark in contents 4 essentially consists of a processing block 41 and a storage block 42.

The processing block 41 consists of an I/O unit 411 that serves for input of MPEG data by which contents are represented and control and level information to be embedded as digital watermarks in specific parts of the contents from an input device such as a keyboard, a storage medium such as a CD-ROM or a DVD-ROM via a reader, or a network via a communication device and output of watermark-including contents; a controller 412 that comprehensively controls the components of the contents serving center for embedding watermark in contents 4; a watermark embedding section 413; and a watermark-including contents generating section 414.

The storage block 42 consists of a contents store 421 into which MPEG data by which contents are represented is stored; a watermark information store 422 into which control information and level information are stored that are to be embedded as digital watermark information in the MPEG data stored in the contents store 412; a watermark pattern store 423 into which a watermark pattern (including data modification method and data locations in which data is modified) is stored for embedding the control and level information stored in the watermark information store 422 as digital watermarks in the contents; a watermark-including block store 424, and a watermark-including contents store 425.

FIG. 3 shows a process flow in the contents serving center for embedding watermark in contents 4 that is configured as described above.

The I/O unit 411 acquires MPEG data by which contents are represented and stores it into the contents store 421. The I/O unit 411 also acquires control information and level information to be embedded as digital watermarks in specific parts of the contents and MPEG data locations (macroblock numbers) corresponding to the specific parts of the contents, associates information with location and stores them into the watermark information store 422 (step S1001).

FIG. 4 shows examples of control information and level information stored in the watermark information store 422.

As shown, per contents number 4211 for identifying contents, a macroblock number 4222 (e.g., indicating the n-th place of the macroblock in order of transmission of the MPEG bitstream) within the MPEG data by which the contents are represented, control information 4223 specifying the type of filtering to be applied to the macroblock, and level information 4224 specifying the condition for applying the filtering to the macroblock are stored as a set into the watermark information store 422.

The watermark embedding section 413 reads one set of a macroblock number 4222, control information 4223, and level information 4224 stored into the watermark information store 422 under the contents number assigned to the MPEG data of the contents on target for handling (step S1002). Then, the watermark embedding section 413 reads the macroblock corresponding to the thus read macroblock number 4222 from the MPEG data on target for handling stored into the contents store 421 (step S1003). Subsequently, the watermark embedding section 413 embeds the control information 4223 and the level information 4224 read from the watermark information store 422 as digital watermarks in the macroblock read from the contents store 421, according to the watermark pattern stored into the watermark pattern store 423. The watermark embedding section 413 stores the macroblock in which the control information 4223 and the level information 4224 have thus been embedded, together with the macroblock number thereof, into the watermark-including block store 424 (step S1004).

The watermark embedding section 413 executes the above procedure for all sets of macroblock number 4222, control information 4223, and level information 4223 stored into the watermark information store 422 under the contents number assigned to the MPEG data of the contents on target for handling (step S100).

The watermark-including contents generating section 414 reads MPEG data of the contents on target for handling from the contents store section 421 and the watermark-including macroblocks stored into the watermark-including block store 424 out of there (step S1006). Then, the watermark-including contents generating section 414 substitutes the watermark-including macroblocks for the corresponding macroblocks in the MPEG data of the contents (the macroblocks in the MPEG data can be identified from the macroblock numbers assigned to the watermark-including macroblocks). The watermark-including contents generating section 414 thus generates watermark-including contents (MPEG data) and stores them into the watermark-including contents store 425 (step S 1007).

The watermark-including contents thus stored into the watermark contents store 425 are, if necessary, output from the I/O unit 411 and sent to the contents distribution center 1.

Figure 5:
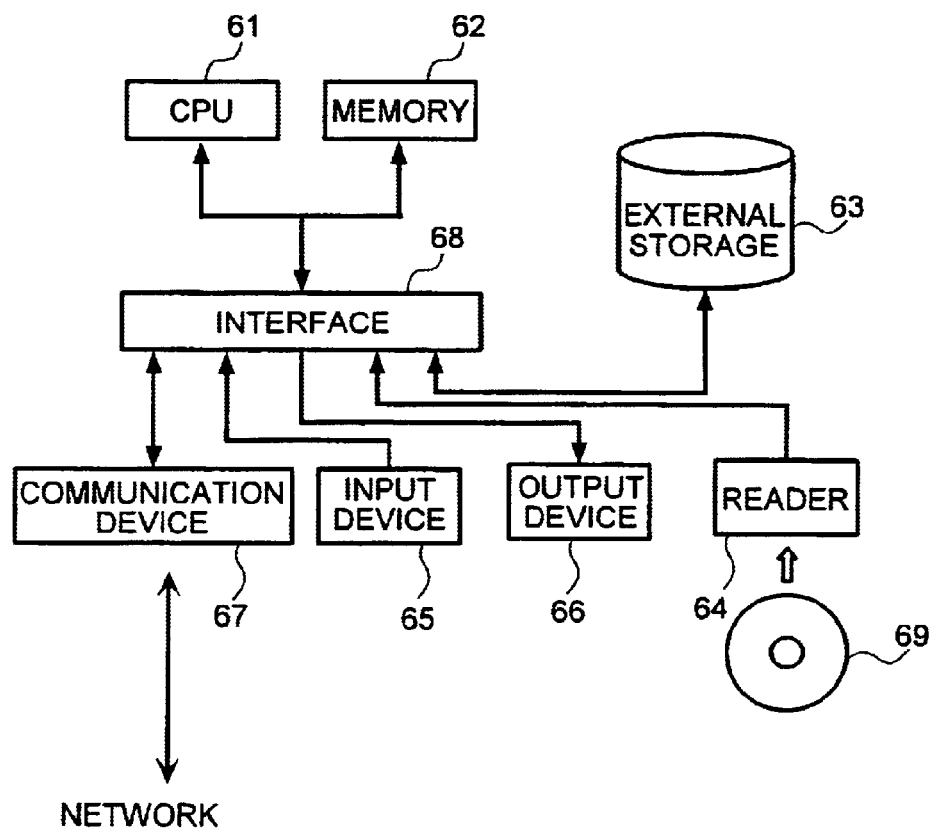
FIG. 5 shows an example of hardware configuration of the contents serving center for embedding watermark in contents 4 shown in FIG. 2.

The above contents serving center for embedding watermark in contents 4 can be built on a electronic computer system of general structure, for example, the one as shown in FIG. 5, where the system has a CPU 61, a memory 62, external storage 63 such as hard disk storage, a reader 64 for reading data from a storage medium 69 such as FD, CD-ROM, DVD-ROM, etc., an output device such as a display, a communication device for communicating with another equipment via a network, and an interface 68 for controlling the data transmission/reception between these components. Here, the above contents serving center for embedding watermark in contents 4 is realized as implementation of all processes thereof embodied on the electronic computer system, as the CPU 61 executes the programs for implementing the processes loaded into the memory 62. In this case, the memory 62 and the external storage 63 are used as the storage block 42.

In the following, the contents distribution center 1 will be detailed.

Figure 6:
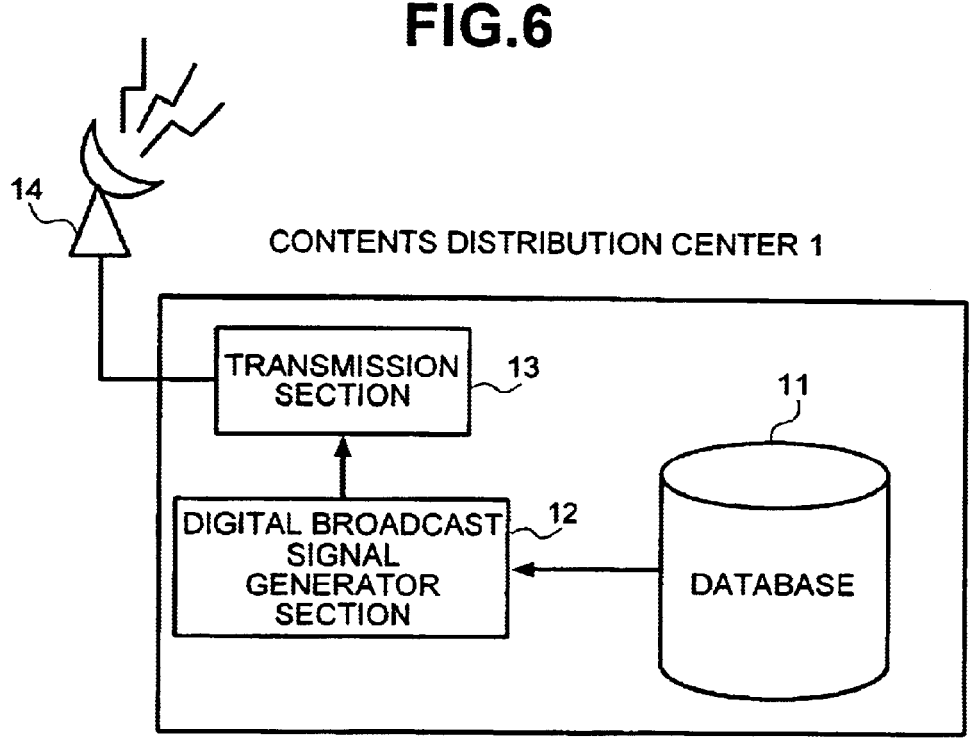
FIG. 6 is a schematic diagram of a contents distribution center 1 shown in FIG. 1.

As shown in FIG. 6, the contents distribution center 1 has a database 11 for storing the watermark-including contents (MPEG data) supplied from the contents serving center for embedding watermark in contents 4, a digital broadcast signal generator section 12 that reads a plurality of the watermark-including contents stored into the database 11 and generates digital broadcast signals by multiplexing the MPEG data of the contents, according to a predetermined digital broadcast data format, and a transmission section 13 that transmits the digital broadcast signals generated by the digital broadcast signal generator section 12 through a transmitting antenna. The configuration of the contents distribution center 1 is basically the same as that of existing digital broadcast signal transmitters.

In the following, the receiving terminal 2 will be detailed.

Figure 7:
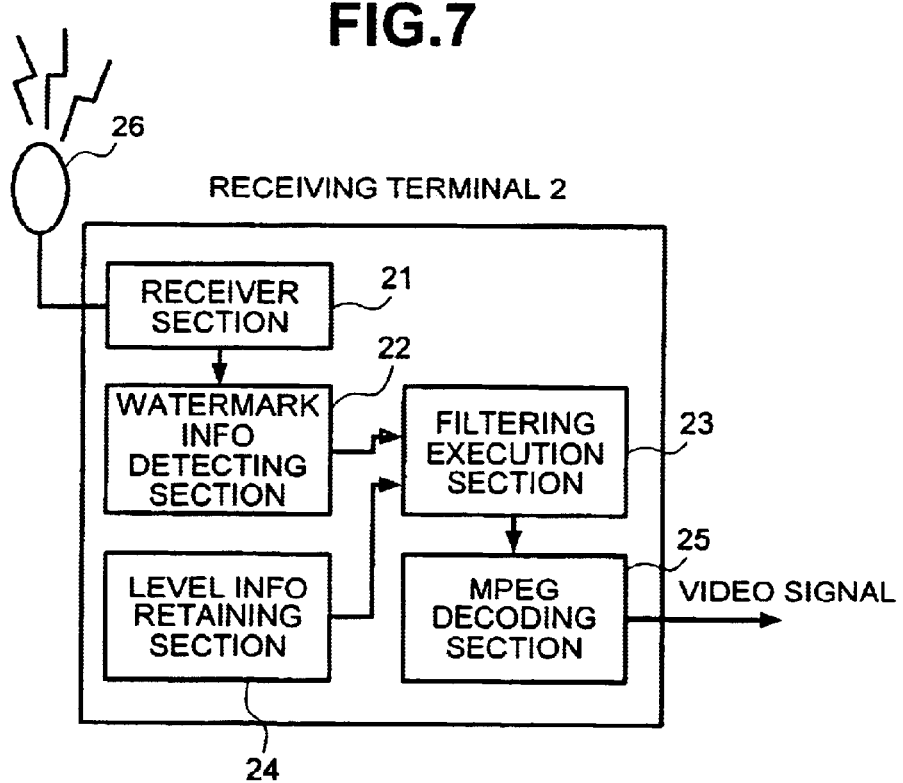
FIG. 7 is a schematic structure diagram of a receiving terminal 2 shown in FIG. 1.

As shown in FIG. 7, the receiving terminal 2 has a receiver section 21 for receiving digital broadcast signals, a watermark information detecting section 22, filtering execution section 23, a level information retaining section 24, and MPEG decoding section 25.

Figure 8:
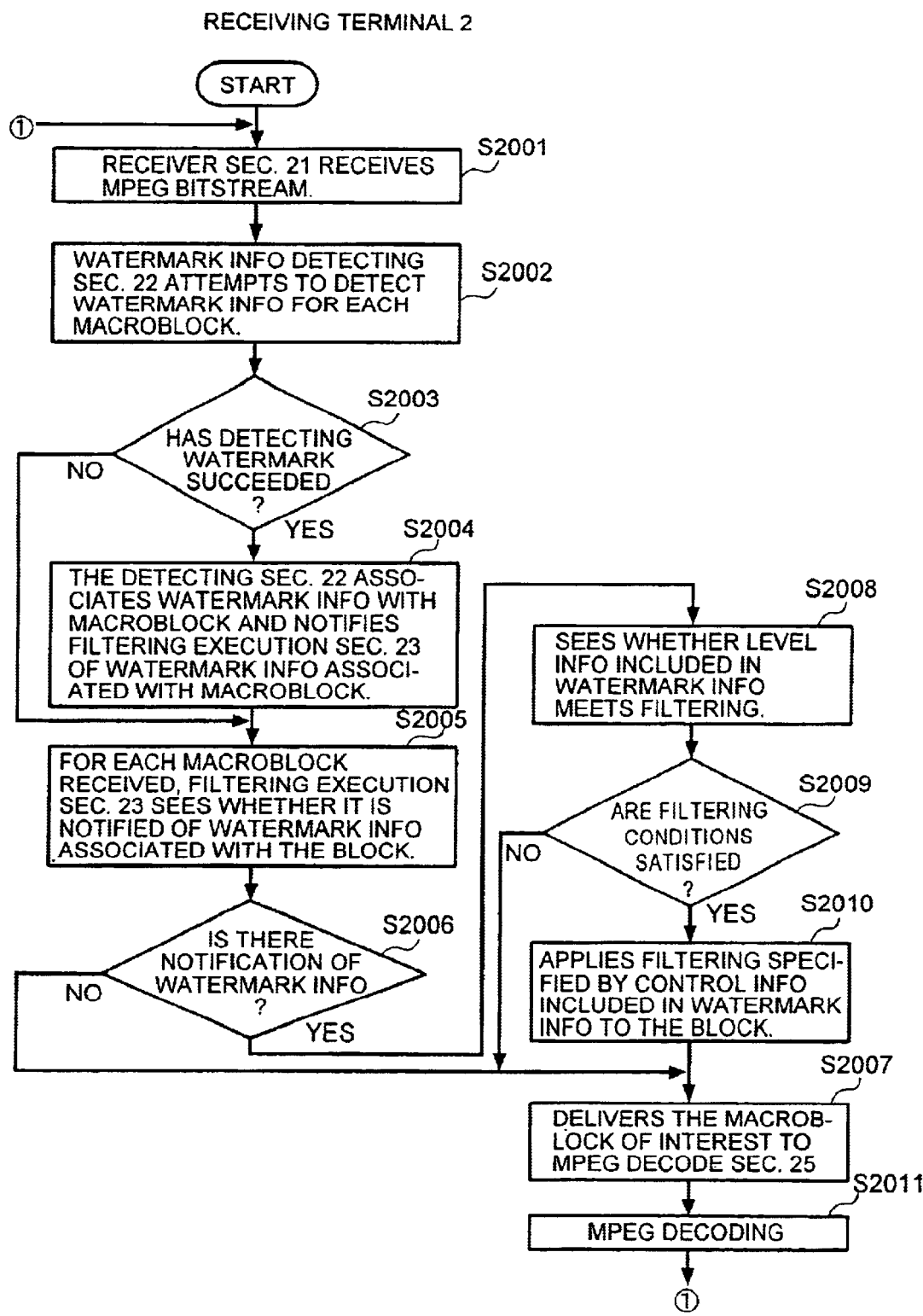
FIG. 8 is a flowchart illustrating the procedure of processing to be carried out in the receiving terminal 2 shown in FIG. 7.

FIG. 8 shows a process flow in the receiving terminal 2 configured as described above.

As requested from the contents user, the receiver section 21 receives the MPEG bitstream by which the desired watermark-including contents are represented out of digital broadcast signals via a receiving antenna 26 (step S2001). The MPEG bitstream are input to the filter execution section 23 through the watermark information detecting section 22. At this time, the watermark information detecting section 22 attempts to detect watermark information for each of the macroblocks out of the MPEG bitstream (step S2002). If the watermark information detecting section 22 has succeeded in detecting watermark information ("Yes" in step S2003), it associates the watermark information with the macroblock from which the watermark information has been detected and notifies the filtering execution section 23 of the watermark information associated with the macroblock (step S2004). The watermark information detecting section 22 retains the same watermark pattern as stored in the watermark pattern store 423 of the contents serving center for embedding watermark in contents 4 and refers to this pattern when attempting to detect watermark information for each macroblock.

When receiving each macroblock out of the MPEG bitstream from the watermark information detecting section 22, the filtering execution section 23 sees whether it is notified of the watermark information associated with the block from the watermark information detecting section 22 (step S2005). Unless there is notification of the watermark information associated with the block ("No" in step S2006), the filtering execution section 23 delivers that block as is to the MPEG decoding section 25 (step S2007). Contrarily, if there is notification of the watermark information associated with the block ("Yes" in step S2006), the filtering execution section 23 compares the level information 4224 included in the watermark information with the level information retained in the level information retaining section 24 and sees whether the latter level information satisfies the conditions for filtering application specified by the former level information 4224 (step S2008).

FIG. 9 shows an example of level information retained in the level information retaining section 24. In this example shown, contents user ID 2411, age (adult/underage) 2412, social position (e.g., teacher/student) 2413, region on target of marketing 2414 of the receiving terminal 2 of interest, distributor (contents distribution center 1) ID 2415 that is distributing the MPEG bitstream being received by the receiver section 21 are retained as level information. Each time the receiver section 21 changes the channel through which it receives MPEG bitstream, it notifies the level information retaining section 24 of the distributor ID 2415 transmitting the MPEG bitstream to it. In this way, the level information retaining section 24 can retain the distributor ID that is currently transmitting MPEG bitstream to the receiving terminal 2. For the remaining items of level information, the dealer of the receiving terminal 2 of interest and the purchaser thereof (contents user) can register these items with the receiving terminal 2 such that the level information retaining section 24 can be preset to retain the contents user ID 2411, age 2412, social position 2413, and the region on target of marketing 2414 of the receiving terminal 2 of interest.

If the level information 4224 included in the watermark information is the information about the age (adult/underage) of the contents user, the filtering execution section 23 reads the age 2412 from the level information retaining section 24 and compares both. If the level information 4224 is the information about the social position (e.g., teacher/student) of the contents user, the filtering execution section 23 reads the social position 2413 from the level information retaining section 24 and compares both. If the level information 4224 is the information about the region where the contents user resides, the filtering execution section 23 reads the region on target of marketing 2414 from the level information retaining section 24 and compares both. If the level information 4224 is the information about the category (private/public) of the contents distributor, the filtering execution section 23 reads the contents distributor 2415 from the level information retaining section 24, identifies the category of the distributor, and compares both. Then, the filtering execution section 23 sees whether the level information stored in the level information retaining section 24 satisfies the conditions for filtering application specified by the level information 4224 included in the watermark information.

As a result, if the conditions for filtering application are satisfied ("Yes" in step S2009), the filtering execution section 23 carries out the filtering specified by the control information included in the watermark information on the macroblock associated with the watermark information (step S2010) and delivers the macroblock to the MPEG decoding section 25 (step S2007). Contrarily, if the conditions for filtering application are not satisfied ("No" in step S2009), the filtering execution section 23 delivers the macroblock associated with the watermark information as is to the MPEG decoding section 25 (step S2007).

The MPEG decoding section 25 decompresses and decodes the MPEG bitstream delivered from the filtering execution section 23 in accordance with the MPEG coding rules and restores video data (step S2011). Then, the video data is output to the display connected to the receiving terminal 2.

The above receiving terminal 2 is not only a special digital broadcast receiver configured by hardware logic with the components, for example, those shown in FIG. 7, but also may be built on an electronic computer system of general structure like the one shown in FIG. 5 as the contents serving center for embedding watermark in contents 4 can be, provided that a communication device with the capability of receiving digital broadcast signals is used as the communication device 67. If the receiving terminal 2 is assumed to be configured as shown in FIG. 5, its receiver section 21, watermark information detecting section 22, filtering execution section 23, and MPEG decoding section 25 are realized as implementation of all processes thereof embodied on the electronic computer system, as the CPU 61 executes the programs for implementing the processes, loaded into the memory 62 from the storage medium 69, external storage 63, or network 5. In addition, the memory 62 and the external storage 63 or a memory card connected to a card adapter, not shown, are used as the level information retaining section 24. Level information is written into the memory 62 and the external storage 63 from the input device 65, the external storage medium 69 through the reader 64 or a network through the communication device 67.

The foregoing are the details of Embodiment 1 of the invention.

According to Embodiment 1, the receiving terminal 2 checks each of the macroblocks constituting the MPEG data to see whether control information is embedded therein as digital watermarks, and when control information is detected in a block, it is determined that filtering is applied to the block. Thus, filtering can be executed for specific parts of the contents represented by the MPEG data, and the contents, parts of which are subjected to the filtering, can be presented to the contents user.

According to Embodiment 1, the contents serving center for embedding watermark in contents 4 embeds the level information for determining whether the filtering specified by the control information is required as well as the control information as digital watermarks in the macroblock in which the control information must be embedded. The receiving terminal 2 determines whether the filtering specified by the control information is to be executed, based on the level information that has been embedded, in combination with the control information, in the block for which the control information embedded therein has been detected. Only if the receiving terminal 2 determines that the predetermined filtering must be applied to the block, the filtering is applied to the block. Thus, depending on several conditions such as the age and social position of the contents user, the region where the contents user resides, and the category of the contents distributor, determination can be made as to whether the filtering is applied to specific parts of the contents. Consequently, there is no need of preparing contents, part of which may or may not be tailored by filtering, depending on the age and social position of the contents user, the region where the contents user resides, and the category of the contents distributor, and other conditions.

A preferred Embodiment 2 of the present invention will be explained below.

When embodying the present invention in Embodiment 2, the inventor assumed a case where contents are distributed from a contents distribution center 1' to a receiving terminal 2' by using a network such as internets and filtering to the contents is executed at the contents distribution center 1'. Using this case as an example, Embodiment 2 is discussed.

Figure 10:
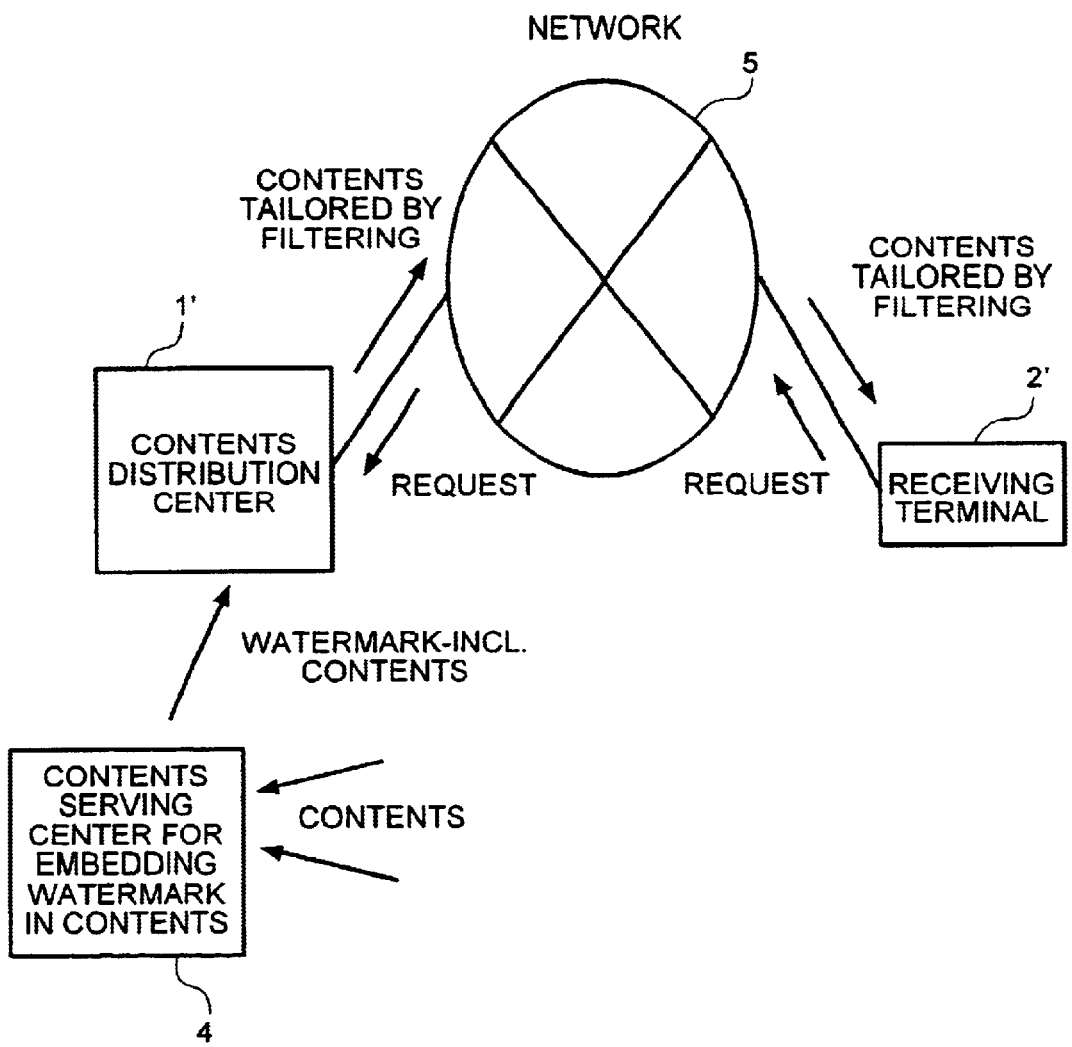
FIG. 10 is a schematic diagram of a contents distribution system to which a preferred Embodiment 2 of the present invention is applied.
Figure 11:
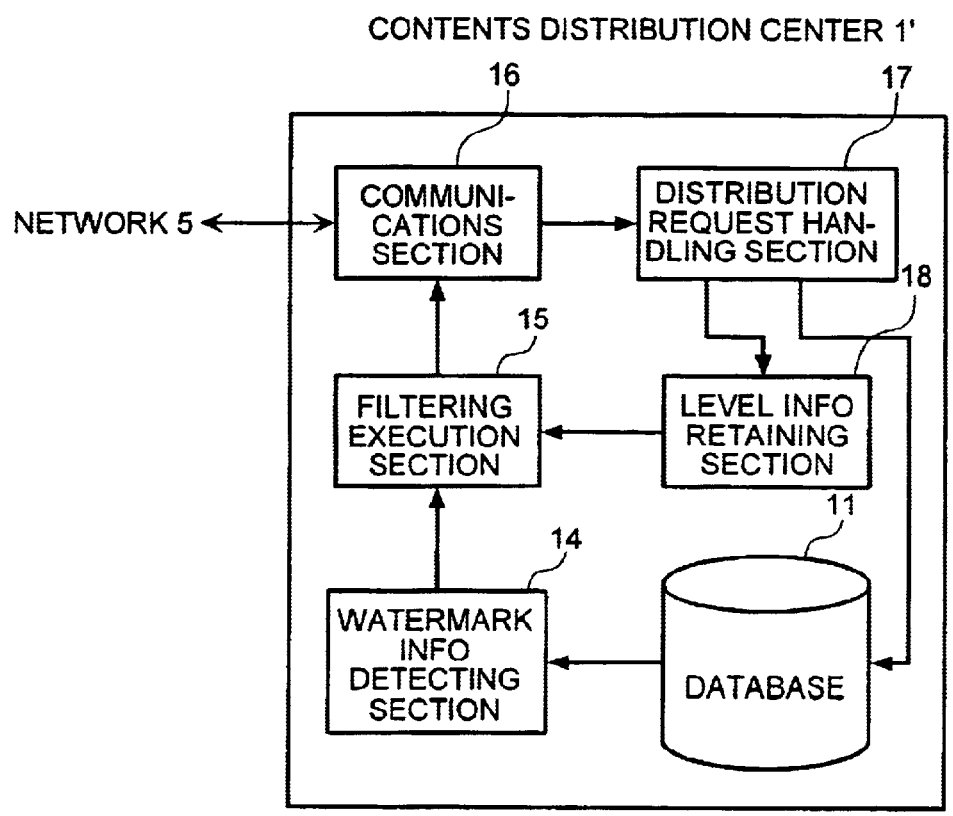
FIG. 11 is a schematic structure diagram of a contents distribution center 1' shown in FIG. 10.

In the contents distribution system according to Embodiment 2, as shown in FIG. 10, the contents distribution center 1' and the receiving terminal 2' are interconnected via a network 5.

As requested from the contents user, the receiving terminal 2' posts a distribution request for contents including the level information (several items of information about the contents user, region, and other conditions) that has in advance stored into the receiving terminal 2' to the contents distribution center 1' via the network 5.

Upon the reception of the request, the contents distribution center 1' attempts to detect watermark information for each macroblock of the requested MPEG data (watermark-including contents received from the contents serving center for embedding watermark in contents 4). If the contents distribution center 1' has succeeded in detecting watermark information from a macroblock, it compares the level information included in the watermark information with the level information included in the request and sees whether the conditions for filtering application are satisfied. If the conditions are satisfied, the contents distribution center 1' executes the filtering specified by the control information included in the watermark information to the macroblock. If the conditions are not satisfied, the contents distribution center 1' does not executes the filtering. Then, the distribution center 1' transmits the MPEG data for which the filtering has been executed if necessary on a per-macro-block basis to the receiving terminal 2' via the network 5.

Consequently, the contents are displayed on the display connected to the receiving terminal 2' with the optional parts thereof modified by filtering such as smoothing, depending on the conditions of contents user, region, etc.

The contents distribution center 1' and the receiving terminals 2', which are the components of the above contents distribution system, will be detailed below. Because the contents serving center for embedding watermark in contents 4 is the same as the one used in Embodiment 1, its detailed explanation will not be repeated.

In the following, the contents distribution center 1' will be detailed.

As shown in FIG. 1, the contents distribution center 1' has a database 11 for storing the watermark-including contents (MPEG data) supplied from the contents serving center for embedding watermark in contents 4, a communications section 16 for communicating with the receiving terminal 2 via the network 5, a distribution request handling section 17, a level information retaining section 18, a watermark information detecting section 14, and a filtering execution section 15.

Figure 12:
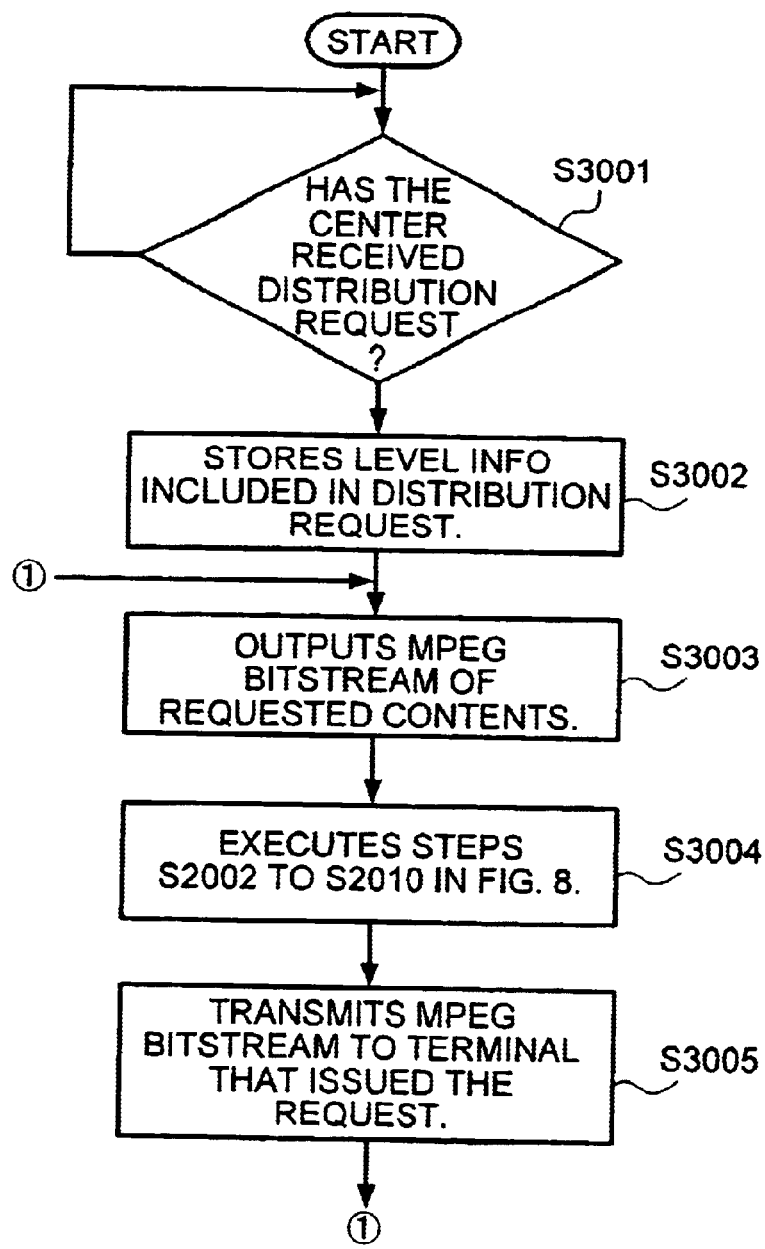
FIG. 12 is a flowchart illustrating the procedure of processing to be carried out in the contents distribution center 1' shown in FIG. 11.

FIG. 12 shows a process flow in the contents distribution center 1' configured as described above.

On receiving a request for contents distribution from the receiving terminal 2' via the network 5 (step S3001), the communications section 16 delivers the request to the distribution request handling section 17. The distribution request handling section 17 stores the level information included in the distribution request delivered from the communications section 16 into the level information retaining section 18 (step S3002), and then reads the MPEG data by which the contents requested for distribution thereof are represented from the database and outputs the MPEG bitstream (step S3003). The MPEG bitstream are input to the filtering execution section 15 via the watermark information detecting section 14. At this time, the watermark information detecting section 14 and the filtering execution section 15 execute the same procedure as the watermark information detecting section 22 and the filtering execution section 23 do as explained in the foregoing section of Embodiment 1 (see steps S2002 to S2010 in FIG. 8) (step S30004).

That is, the watermark information detecting section 14 attempts to detect watermark information for each macroblock of the MPEG bitstream. If the watermark information detecting section 14 has succeeded in detecting watermark information, it associates the watermark information with the macroblock from which the watermark information has been detected and notifies the filtering execution section 15 of the watermark information associated with the macroblock.

For each macroblock of the MPEG bitstream received from the watermark information detecting section 14, the filtering execution section 15 sees whether it is notified of the watermark information associated with the block from the watermark information detecting section 14. Unless there is notification of the watermark information associated with the block, the filtering execution section 15 delivers the block as is to the communications section 16. Contrarily, if there is notification of the watermark information associated with the block, the filtering execution section 15 compares the level information 4224 included in the watermark information with the level information retained in the level information retaining section 18 and sees whether the latter level information satisfies the conditions for filtering application specified by the former level information 4224. As a result, if the conditions for filtering application are satisfied, the filtering execution section 15 carries out the filtering specified by the control information included in the watermark information on the macroblock associated with the watermark information and delivers the macroblock to the communications section 16. Contrarily, if the conditions for filtering application are not satisfied, the filtering execution section 15 delivers the macroblock associated with the watermark information as is to the communications section 16.

The communications section 16 transmits the MPEG bitstream delivered from the filtering execution section 15 to the receiving terminal 2' that issued the request for distribution via the network 5 (step S3005).

The above procedure (steps S 3002 to S3005) is repeated until reading of all requested MPEG data from the database 11 has been completed.

The above contents distribution center 1' may be built on an electronic computer system of general structure like the one shown in FIG. 5 as the contents serving center for embedding watermark in contents 4 can be. If the contents distribution center 1' is assumed to be configured as shown in FIG. 5, its communications section 16, distribution request handling section 17, watermark information detecting section 14, and the filtering execution section 23 are realized as implementation of all processes thereof embodied on the electronic computer system, as the CPU 61 executes the programs for implementing the processes, loaded into the memory 62 from the storage medium 69, external storage 63, or network 5. In addition, the memory 62 and the external storage 63 are used as the database 11 and the level information retaining section 24.

In the following, the receiving terminal 2' will be detailed.

Figure 13:
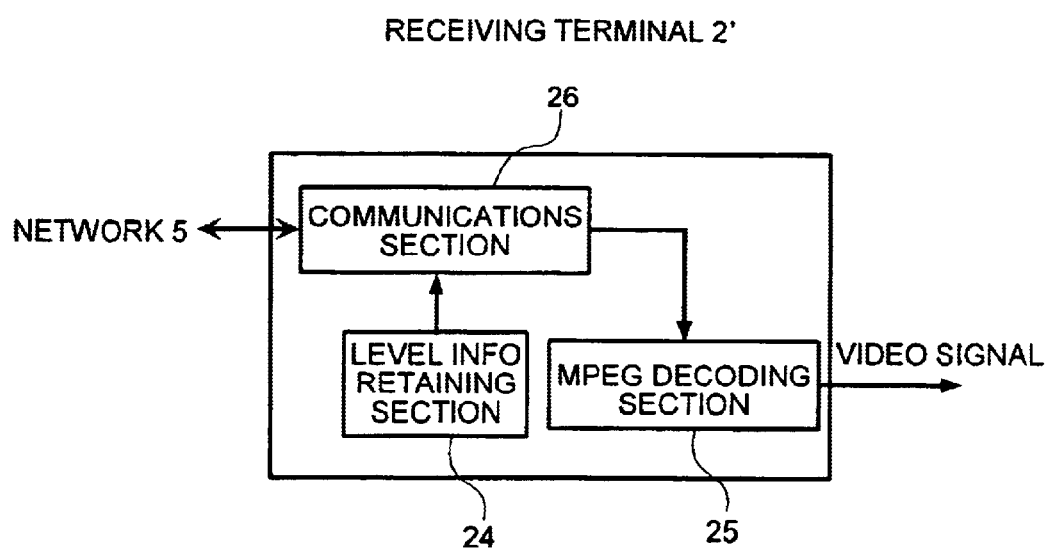
FIG. 13 is a schematic structure diagram of a receiving terminal 2' shown in FIG. 10.

As shown in FIG. 13, the receiving terminal 2' has a communications section 26 for communicating with the contents distribution center 1 via the network 5, a level information retaining section 24, and a MPEG decoding section 25.

As requested from the contents user, the communications section 26 generates a request for distribution of desired contents, incorporating level information stored in the level information retaining section 24 in the request, and transmits the request to the contents distribution center 1' via the network 5. The communications section 26 also delivers the MPEG bitstream (part of which may be tailored by filtering)

received from the contents distribution center 1' to the MPEG decoding section 25. The MPEG decoding section ~25 decompresses and decodes the MPEG bitstream delivered from the communications section 26 in accordance with the MPEG coding rules and restores video data. Then, the video data is output to the display connected to the receiving terminal 2'.

The above receiving terminal 2' is not only a special receiving terminal configured by hardware logic with the components, for example, those shown in FIG. 13, but also may be built on an electronic computer system of general structure like the one shown in FIG. 5 as the receiving terminal 2 in Embodiment 1 can be.

In addition to having the same advantages as the foregoing Embodiment 1 has, Embodiment 2 features that the receiving terminal 2' need not have special hardware and software because the contents distribution center 1' executes filtering on contents.

The present invention may be embodied in other specific forms and a number of modifications to the foregoing Embodiments are possible within the scope of the spirit or essential characteristics the invention.

For example, in the foregoing Embodiment 1, the contents distribution center 1 may distribute watermark-including contents by means of a storage medium such as CD-ROM or DVD-ROM rather than the communication medium such as digital broadcasting. Accordingly, the receiving terminal 2 may be equipped with a reader of the storage medium instead of the receiver section 21 to make available the watermark-including contents stored into the storage medium through the reader.

An example of modification to the foregoing Embodiment 2 is such that the receiving terminal 2' may send a request for distributing contents to the contents' distribution center 1' via the network 5 and the contents distribution center 1' may send the contents tailored by filtering to the receiving center 2' by means of digital broadcasting as is the case in the forgoing Embodiment 1.

Moreover, although the foregoing description of the Embodiments discussed MPEG data compressed and coded in accordance with the MPEG coding rules as an example of electronic data by which contents are represented, the invention is also applicable to data of formats other than MPEG. Furthermore, units of data in which control information and level information are embedded as watermark information are not limited to macroblock units. For example, embedding digital watermarks may be applied in units of frames or frame groups consisting of a plurality of successive frames. In addition, contents as such are not limited to video data, but embrace still picture data and audio data. Filtering on audio data includes muting and translating into a given tone, which are applied to conceal specific parts of contents.

Furthermore, as concerns the level information as digital watermarks to be used in the invention, there may be alternatives to the level information discussed in the foregoing Embodiments for determining whether filtering should be applied to specific parts of contents.

For example, the information as digital watermarks can be used as will be mentioned below. If a contents maker is assumed to prepare a reproducing key and allow only the customers who bought this key to view and/or listen to predetermined parts of the distributed contents, the reproducing key, together with control information to specify filtering such as smoothing, should be embedded as digital watermarks in the predetermined parts of the electronic data of the contents. Then, the filtering execution section 15 or 23 should execute the filtering unless the same reproducing key is retained in the level information retaining section 14 or 24.

If a contents maker is assumed to distribute contents of a sample version with a limited period of use specified (during which people can view and/or listen to the contents), level information about the use period, together with control information to specify filtering such as smoothing, should be embedded as digital watermarks in specific parts of the electronic data of the contents, the parts to be concealed after the expiry of the period. Then, the filtering execution section 15 or 23 should execute the filtering on the specific parts of the electronic data of the contents only if the use period specified by the level information included in the watermark information detected from the specific parts of the electronic data of the contents is past the current date.

If a contents maker is assumed to distribute contents of a sample version with a maximum number of times of use specified (up to which people can view and/or listen to the contents), level information about the maximum number of times the contents are replayed, together with control information to specify filtering such as smoothing, should be embedded as digital watermarks in specific parts of the electronic data of the contents, the parts to be concealed when the above maximum number of times are exceeded. Then, the filtering execution section 15 or 23 should execute the filtering on the specific parts of the electronic data of the contents only if the number of times the contents have been replayed (viewed and or listened to) (for this purpose, the level information retaining section 14 or 24 should be designed to have counters into which the count of replay per contents is to be stored, such that, each time the contents are replayed, the associated counter would increment by one) exceeds the maximum number of times specified by the level information included in the watermark information detected from the specific parts of the electronic data of the contents.

If a contents maker is assumed to prepare a reproducing key and allow only the customers who bought this key to view and/or listen to the contents until a valid period has expired, after which people are free to enjoy the contents, level information about the reproducing key and the valid period, together with control information to specify filtering such as smoothing, should be embedded as digital watermarks in specific parts of the electronic data of the contents, the parts to be concealed for those people other than the customers who bought the key before the expiry of the valid period. Then, the filtering execution section 15 or 23 should execute the filtering if the current date falls within the valid period specified by the level information included in the watermark information detected from the specific parts of the electronic data of the contents and unless the same reproducing key as specified by the level information is retained in the level information retaining section 14 or 24.

The forgoing Embodiments discussed as an example a case where control information is embedded as digital watermarks in specific parts (macroblocks) of the data of contents and the filtering specified by the control information is applied to the parts. However, alternatives to this are possible.

If, for example, you want to apply filtering to the corresponding portions of a plurality of successive frames, you can implement this by embedding start control information to specify the start of application of filtering in a portion of the first frame of the frames and end control information to specify the end of application of filtering into the corresponding portion of the last frame, where the portion is the portion to which you want to apply filtering. When detecting the start control information from the portion of the first frame, the equipment to distribute these successive frames or reproduce the contents from these frames should apply the filtering to that portion from which the start control information has been detected and the corresponding portions of the frames following the first frame until the end control information embedded in the corresponding portion of the last frame has been detected.

The processing for this is implemented by modifying the foregoing Embodiments as follows. When it is assumed that filtering is applied to the corresponding portions of a plurality of successive frames, the contents serving center for embedding watermark in contents 4 embeds the start control information in a macroblock that is the portion to which the filtering is to be applied of the first frame and in another macroblock that is the corresponding portion of the last frame, and the information for the macroblocks is stored into the watermark information store 422. For this case, in the table shown in FIG. 4, thus, a flag indicating the type of control information (start, end, or discrete (filtering is applied only once to only the block in which control information has been embedded)) should be registered for each macroblock number 4222. The level information 4224 for the end control information should not be set in this table.

On the other hand, the filtering execution section 15 or 23, for each macroblock of the MPEG bitstream received from the watermark information detecting section 14 or 22, monitors for a notification of watermark information associated with the block, posted from the watermark information detecting section 14 or 22. If there is this notification, the filtering execution section 15 or 23 sees whether level information 4224 is included in the watermark information. If level information is included, the filtering execution section 15 or 23 compares it with the level information retained in the level information retaining section 24 to see whether the conditions for filtering application are satisfied. If the conditions are satisfied or if level information 4224 is not included in the watermark information, the filtering execution section 15 or 23 refers to the type of control information included in the watermark information. If the type of control information is start control information, the filtering execution section 15 or 23 applies the filtering specified by the control information included in the watermark information to the macroblock associated with the watermark information and the corresponding macroblocks in the frames following the frame including the macroblock. The filtering execution section 15 or 23 continues to apply the filtering until it has detected a notification of watermark information with the flag of end control information associated with another macroblock that is the corresponding portion of the last frame. The corresponding macroblocks in the frames following the frame including the macroblock with its watermark information with the flag of start control information detected can be identified, based on the place of the above macroblock in the sequence of the blocks in the frame and the number of macroblocks constituting one frame.

Alternatively, for example, it is possible that control information and information indicating the portions of the data of the contents, the portions to which the filtering specified by the control information is to be applied, are embedded as digital watermarks in a predetermined portion of the contents data. In this case, the equipment to distribute the contents data or reproduce the contents from the data detects the watermark information from the predetermined portion of the contents data and applies the filtering specified by the control information included in the watermark information to the portions specified by the information included in the watermark information.

The processing for this is implemented by modifying the foregoing Embodiments as follows. The watermark embedding section 413 of the contents serving center for embedding watermark in contents 4 embeds digital watermarks in a predetermined macroblock of the contents (for example, the first macroblock or a portion that may comprise a plurality of macroblocks, of course). The digital watermark information has sets of the macroblock numbers 4221 to be tailored by filtering under the contents number 4221 of the contents and associated control information 4223 and level information 4224 (see FIG. 4).

On the other hand, the watermark information detecting section 14 or 22 detects the watermark information from the predetermined macroblock in the MPEG bitstream and notifies the filtering execution section 15 or 23 of the watermark information. When receiving this notification, the filtering execution section 15 or 23 checks each of the macroblocks identified by the macroblock numbers in the sets contained in the watermark information to see whether the conditions for filtering application specified by the associated level information 4224 are satisfied. If the conditions are satisfied, the filtering execution section 15 or 23 applies the filtering specified by the associated control information 4223 to the macroblock.

Although level information for determining whether filtering is to be applied, together with the control information to specify filtering to be applied, is embedded in specific parts of electronic data of contents in the foregoing Embodiments, the level information may be omitted. If level information is omitted, the information for the copyright of the contents should be embedded as digital watermarks in the contents separately from the control information. By using this copyright information, determination can be made as to whether the filtering specified by the control information is to be applied to specific parts of the digital data of the contents, the parts in which the control information has been embedded. For example, in advance of the processing of the filtering execution section 15 or 23, the copyright information embedded as digital watermarks is detected from the contents. The filtering execution section 15 or 23 calculates a period of secrecy retention from the date of creation included in the detected copyright information, according to a predetermined rule. Only if the current date falls within the period of secrecy retention, the filtering execution section 15 or 23 applies the filtering specified by the control information to specific parts of the digital data of the contents, the parts in which the control information has been embedded. If not, the filtering execution section 15 or 23 does not apply the filtering.

If the level information for determining whether filtering is to be applied is not used as described above, the filtering execution section 15 or 23 may be installed on a replay equipment located on a contents distribution route between a contents distribution center and a receiving terminal, instead of installing on the contents distribution center or the receiving terminal. For example, in the foregoing Embodiment 2, if the contents distribution center 1' is assumed to the network 5 via a LAN, not shown, and a replay equipment is located between the LAN and the network 5, the watermark detecting section and the filtering execution section 15 provided in the contents distribution center 1' may be relocated to the relay equipment.

Although the foregoing Embodiments discussed as an example a case where a contents maker, the contents serving center for embedding watermark in contents 4, and the contents distribution center 1 or 1' are independent from each other, any two or all of them may be integrated into a single system architecture.

Furthermore, filtering used in the invention is not limited to such contents rendering control as smoothing, mosaic patching, or muting to conceal contents in part. Alternatives are, for example, effects on rendering contents to tailor the contents for contents users, which are applied, depending on the age, social position, or some other attribute of the contents user.

As concerns FIG. 4, a plurality of sets of control information 4223 and level information 4224 may be associated with a single macroblock number 4222. This means that a plurality of items of control and level information can be specified for a portion of contents and filtering applied to the portion can differ based on these items. For example, it is conceivable that different filtering types, smoothing, mosaic, and solid black, specified as the control information for a specific portion of contents be selectively applied to the portion in different regions.

As described above, the present invention enables the application of filtering to specific parts of electronic data by which contents are represented by using digital watermark technique.

In the foregoing Embodiments, programs (also, referred to as codes or modules in some context) for implementing the functional components of the Embodiments on an electronic computer when being executed by the CPU 61 are stored in advance into the external storage 63, loaded, if necessary, into the memory 62, and executed by the CPU 61. Alternatively, the programs are loaded from the storage medium 69 through the reader 64 into the memory 62 and executed by the CPU 61. Alternatively, the programs, after once installed in the external storage 63 from the storage medium 69 through the reader 64, are loaded, if necessary, from the external storage into the memory 62 and executed by the CPU 61. Alternatively, from a remote server connected to the computer system through the communication device 67 and via the network, the programs are once downloaded into the external storage 63 via a computer readable medium into which the programs are transduced, or in other words embodied; i.e., via transmission signals over the network, and loaded into the memory 62, or directly loaded into the memory 62 from the network, and then executed by the CPU 61.

The specification and drawings are, accordingly, to be regarded in an illustrative rather than a restrictive sense. It will, however, be evident that various modifications and changes may be made thereto without departing from the broader sprit and scope of the invention as set forth in the claims.

We claim:

1. A method for controlled filtering a portion of contents data in reproducing or distributing, wherein, the contents data comprises a plurality of portions, and control information specifying predetermined filtering for a predetermined portion has been embedded in the contents data as a digital watermark;

said method comprising the steps of:

retaining level information in a terminal involved in the reproducing or distributing of the contents data;

obtaining level information retained in the terminal;

extracting the control information from the contents data;

deciding how to execute the predetermined filtering for the predetermined portion of the contents data based on the extracted control information and the obtained level information;

filtering the predetermined portion of the contents data according to the decision; and reproducing or distributing the contents data with the filtered predetermined portion and at least one unfiltered portion.

2. A method according to claim 1, wherein the predetermined portion of the contents data is a portion of the contents data where the control information has been extracted from.

3. A method according to claim 1, wherein:

the control information includes one or more items of level information for determining whether the predetermined filtering is to be applied to the predetermined portion of the contents data; and the deciding step comprises determining whether the predetermined filtering is applied to a specific portion of the contents, based on one or more items of the level information included in the control information.

4. A method according to claim 3, wherein:

the level information included in the control information comprises information about a level of the contents user; and the determining step comprises comparing the level of the contents user specified by the level information included in the control information with a registered level of an actual contents user indicated by the obtained level information; and determining whether the predetermined filtering is applied to the predetermined portion of the contents data based on a result of the comparison.

5. A method according to claim 3, wherein:

the level information included in the control information comprises information about a level of a contents distributor; and the determining step comprises comparing the level of the contents distributor specified by the level information included in the control information with a level of a contents distributor that is distributing the contents indicated by the obtained level information; and determining whether the predetermined filtering is applied to the predetermined portion of the contents data based on a result of the comparison.

6. A method according to claim 3, wherein:

the level information included in the control information comprises information about a predetermined period of use of the contents data; and the determining step comprises comparing the period specified by the level information with the current date and time; and determining whether the predetermined filtering is applied to the predetermined portion of the contents data based on a result of the comparison.

7. A method according to claim 3, wherein:

the level information comprises region information included in the control information; and the determining step comprises comparing the region specified by the level information included in the control information and a region where a contents user resides indicated by the obtained level information; and determining whether the predetermined filtering is applied to the predetermined portion of the contents data based on a result of the comparison.

8. A method according for controlled filtering a portion of contents data in reproducing or distributing, wherein, the contents data comprises a plurality of portions and control information specifying predetermined filtering for a predetermined portion has been embedded in the contents data as a digital watermark;

said method comprising the steps of;

extracting the control information from the contents data, wherein the control information includes one or more items of level information for determining whether the predetermined filtering is to be applied to the predetermined portion of the contents data; and the level information comprises information about a maximum number of times the contents are replayed;

deciding how to execute the predetermined filtering for the predetermined portion of the contents data based on the extracted control information, wherein the deciding step comprises determining whether the predetermined filtering is applied to a specific portion of the contents, based on one or more items of the level information included in the control information; and the determining step comprises comparing the maximum number of times the contents are replayed as specified by the level information included in the control information and the number of times a contents user has replayed the contents data; and determining whether the predetermined filtering is applied to the predetermined portion of the contents data based on a result of the comparison;

filtering the predetermined portion of the contents data according to the decision; and reproducing or distributing the contents data with the filtered predetermined portion and at least one unfiltered portion.

9. An apparatus for controlled filtering a portion of contents data, wherein, the contents data comprises a plurality of portions, and control information specifying predetermined filtering of a predetermined portion has been embedded in the contents data as a digital watermark;

said apparatus comprising:

an extracting unit that extracts control information from the contents data;

a deciding unit that obtains level information from a terminal involved in reproducing or distributing the contents data and decides how to execute the predetermined filtering for the predetermined portion of the contents data based on the extracted control information and the obtained level information; and a filtering unit that filters the predetermined portion of the contents data according to the decision and outputs the filtered portion of the contents data together with at least one unfiltered portion of the contents data.

10. The apparatus according to claim 9, further comprising a reproducing unit that reproduces the output contents data.

11. The apparatus according to claim 9, wherein:

the control information includes one ore more items of level information for determining whether the predetermined filtering is to be applied to the predetermined portion of the contents data; and the deciding unit compares at least one level specified by the one or more items of level information included in the control information with at least one level specified by the obtained level information, and the deciding unit determines whether predetermined filtering is applied to the predetermined portion of the contents data.

12. The apparatus according to claim 11, wherein the at least one level specified by the one or more items of information included in the control information comprises one or more items from the group consisting essentially of: contents user level, contents distribution level, period of contents use, maximum number of contents replays, and region.

13. The apparatus according to claim 9, wherein:

the apparatus is coupled to a network; and the apparatus further comprises a distribution unit to distribute the filtered contents data to a contents user's terminal via the network.

14. A program product for controlled filtering a portion of contents data in reproducing or distributing, wherein, the contents data comprises a plurality of portions, and control information specifying predetermined filtering of a predetermined portion has been embedded in the contents data as a digital watermark, said product comprising:

a computer readable medium; and code embodied in the medium, execution of the code causing implementation of the steps comprising:

obtaining level information retained in a terminal involved in the reproducing or distributing of the contents data;

extracting the control information from the contents data;

deciding how to execute the predetermined filtering for the predetermined portion of the contents data based on the extracted control information and the obtained level information;

filtering the predetermined portion of the contents data according to the decision; and reproducing or distributing the contents data for the terminal with the predetermined filtered portion and at least one unfiltered portion.

15. The program product of claim 14, wherein the computer readable medium is a computer readable medium for storing the code.

16. A program product of claim 14, wherein the computer readable medium is a computer readable medium for transmitting the code.

17. A contents rendering control method for tailoring of electronic data by which contents to be reproduced or distributed are represented, the electronic data having been prepared with control information embedded as digital watermarks, the control information specifying application of predetermined filtering to predetermined parts of the electronic data and level information including a maximum number of times the contents may be replayed, the contents rendering control method comprising:

before reproducing or distributing contents from the electronic data detecting the control information from the electronic data;

comparing the maximum number of times the contents may be replayed as specified in the level information included in the detected control information and number of times a contents user has replayed the contents from the electronic data, to determining whether to apply filtering; and if the comparing step results in a determination to apply filtering, applying the predetermined filtering specified by the control information to specific parts of the contents.

18. A method for controlled filtering of at least one of a plurality of blocks of contents data from a content stream comprising a plurality of blocks of contents data, in reproducing or distributing, wherein control information regarding filtering has been embedded as a digital watermark, in one or more of the blocks of contents data;

said method comprising the steps of:

examining each of the blocks of contents data for a digital watermark;

extracting control information including level information from an examined block having an embedded digital watermark;

obtaining level information from a terminal involved in the reproducing or distributing of the contents data;

processing the extracted level information and the obtained level information to determine whether to apply filtering, and processing the extracted control information to identify at least one of the blocks of contents data to which filtering is to be applied;

filtering the contents data of the identified at least one block; and reproducing or distributing contents data from the plurality of blocks of the content stream including the filtered contents data and contents data of one or more unfiltered blocks.

19. The method of claim 18, wherein the filtering step comprises applying a predetermined one of a plurality of filtering techniques, specified in the extracted control information, to the at least one block, based on the extracted control information.

20. A program product comprising a computer readable medium and executable code embedded in the medium for implementing the method of claim 18.

21. The method of claim 18, wherein:

the stream of contents data comprises a Motion Pictures Experts Group (MPEG) data stream; and the blocks of contents data comprise MPEG macroblocks.

22. The method of claim 18, wherein:

the contents data includes image data; and the predetermined filtering comprises image processing for selective image-rendering control.

23. A method for controlled filtering of contents data in reproducing or distributing, wherein:

control information specifying predetermined filtering has been embedded in the contents data as a digital watermark; and the control information comprises one or more items of level information for determining whether the predetermined filtering is to be applied to a specific portion of the contents data, including information about a maximum number of times the contents are replayed;

said method comprising the steps of:

extracting the control information from the contents data;

deciding how to execute the predetermined filtering of the contents data based on the extracted control information;

determining whether the predetermined filtering is to be applied to a specific portion of the contents, based on one ore more items of the level information included in the control information, wherein the determining step comprises:

comparing the maximum number of times the contents are replayed as specified by the level information included in the control information and a number of times a contents user has replayed the contents from the electronic data in question; and determining whether the predetermined filtering is applied to the specific portion of the contents;

upon determining to apply the predetermined filtering, filtering the specific portion of the contents data according to the decision as to how to execute the predetermined filtering; and reproducing or distributing of the filtered contents data.

* * * * *